Dec. 10, 1940. O. SHECK 2,224,801

CONTROL MECHANISM FOR TWIN BATCH PAVING MACHINES

Filed June 9, 1938 5 Sheets-Sheet 1

Inventor

OSCAR SHECK

By Robert Robb

ATTORNEYS

Dec. 10, 1940.　　　O. SHECK　　　2,224,801
CONTROL MECHANISM FOR TWIN BATCH PAVING MACHINES
Filed June 9, 1938　　　5 Sheets-Sheet 3

Fig.3.

Inventor
OSCAR SHECK.
By Robb+Robb
ATTORNEYS

Dec. 10, 1940.  O. SHECK  2,224,801
CONTROL MECHANISM FOR TWIN BATCH PAVING MACHINES
Filed June 9, 1938  5 Sheets-Sheet 4

Inventor
OSCAR SHECK.
By Robb & Robb
ATTORNEYS.

Patented Dec. 10, 1940

2,224,801

UNITED STATES PATENT OFFICE 2,224,801

CONTROL MECHANISM FOR TWIN BATCH PAVING MACHINES

Oscar Sheck, Milwaukee, Wis., assignor to Koehring Company, Milwaukee, Wis., a corporation Application June 9, 1938, Serial No. 212,834

11 Claims. (Cl. 259—163)

The present invention appertains to an automatic control mechanism for paving machines commonly employed in the construction of roads or the like for preparing specified concrete mixtures. More particularly, the present invention relates to control mechanism for such types of paving machines which employ a plurality of mixing drums in which the mixing of the aggregates of concrete batches is accomplished in a continuous cycle and in an overlapped manner of operation.

Paving machines of the nature referred to herein comprise a plurality of mixing drums or chambers cooperatively associated in such a manner that the aggregates may be pre-mixed in one drum for a certain length of time and then transferred to the next drum for the completion of the mixing operation so as to permit the introduction of the next batch of aggregates into the first drum before the mixing period of the first batch of aggregates has been completed in the second drum, to thereby obtain a greater output of mixed concrete than would be accomplished by a single drum paver.

From the above it will therefore be apparent that to obtain the most efficient operation of such paving machines of the dual drum type it is of vital importance to control the mixing cycles of such machines in regard to each individual batch to be produced thereby, as well as in regard to the succeeding batch, and in overlapped relationship thereto, so as to obtain absolute uniformity of the concrete mixture of each batch produced by the machine.

It is therefore the primary object of the present invention to provide an automatic control for paving machines of the dual mixing drum type for automatically controlling the mixing cycle of each individual batch and for automatically controlling the mixing cycle of the succeeding batch in regard to itself and in proper overlapped relationship to the preceding cycle.

A further object of the present invention is the provision of special control instrumentalities which are cooperatively associated with the batchmeter mechanism, with which paving machines are usually provided, in such a manner as to control the mixing cycles of the machine in direct dependency on the batchmeter or timing mechanism.

A still further object of the present invention is to provide a mixing cycle control mechanism cooperatively associated with the batchmeter mechanism, together with interlocking instrumentalities between said control mechanism and batchmeter structure to obtain certain interlocking functions for preventing operation of certain parts until others are in such condition as to effect the release of said locking means to thereby cause completion of the mixing cycle and discharge of the mixed aggregates from the machine.

Another object of the present invention is the provision of a control mechanism for a twin batch paver which includes instrumentalities for controlling the charging, discharging, and transferring operations of the batches handled by the machine in a proper correlated manner.

Further objects and advantages of the present invention will become apparent from the following description and accompanying drawings, in which

Figure 6 illustrates a diagrammatic view of the control instrumentalities of a dual drum paver, together with associated parts operated thereby.

Certain features of construction embodied in this application are shown more fully in the pending application of E. H. Lichtenberg and Oscar Sheck, Serial No. 174,902, filed Nov. 16, 1937, which issued into Patent No. 2,167,243 on September 25th, 1939, and to which reference is made for a more full understanding of such features.

Figures 1, 8, 9:
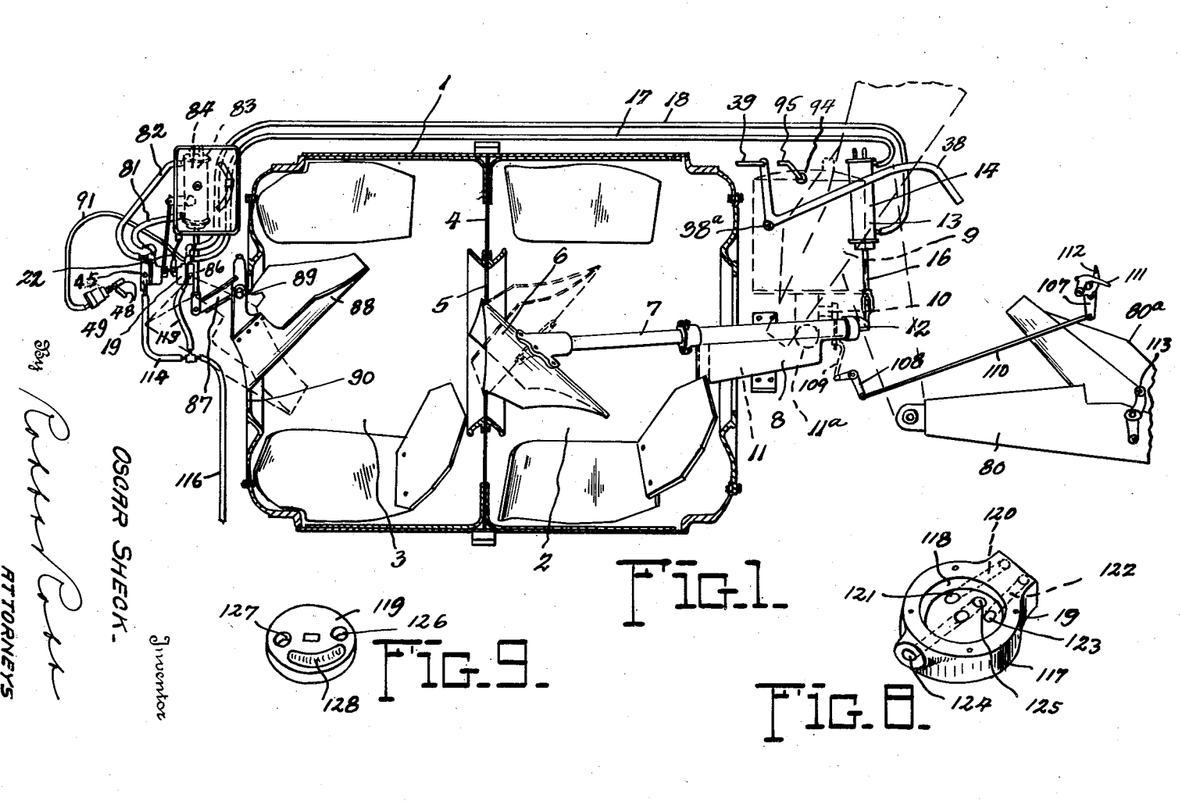
Figure 1 is a sectional view through the mixing chambers of a paver of the twin batch type, illustrating the charging, transfer, and discharging instrumentalities together with the control mechanism for the same.
Figures 8 and 9 illustrate respective detail views of certain parts of the control valve structure as shown in Figure 4.

Referring now to the drawings, and particularly to Figure 1, I indicates a mixing drum structure of a twin batch paving machine which comprises the mixing chambers 2 and 3 separated from each other by means of a centrally located partition 4, which is provided with a circular opening 5 through which material may be transferred from the chamber 2 to the chamber 3 by means of a transfer chute 6 adapted to assume transferring and non-transferring positions. The transfer chute 6 is mounted on a shaft 7 secured by a bracket structure 8 to the frame of the machine, not shown, in any conventional manner. The bracket 8 is partially hollow and provided with a passage to enable the introduction of water from the water measuring tank 9 through water control valve 10, through passage 11, into the mixing chamber 2.

The free end of the shaft 7 referred to hereinbefore is connected by means of an arm 12 to transfer chute operating means 13, see Figures 1 and 6, which comprise a cylinder 14, piston 15, and piston rod 16, the latter being connected to the arm 12 so that upon operation of the piston 15, shaft 7 is rotated to effect movement of the transfer chute 6 from its full line, non-transferring position, as shown in Figure 1, to its dotted line position, as shown in the same figure, which is its transferring position for transferring material from the chamber 2 to the chamber 3 upon rotation of the drum.

Figures 4, 5:
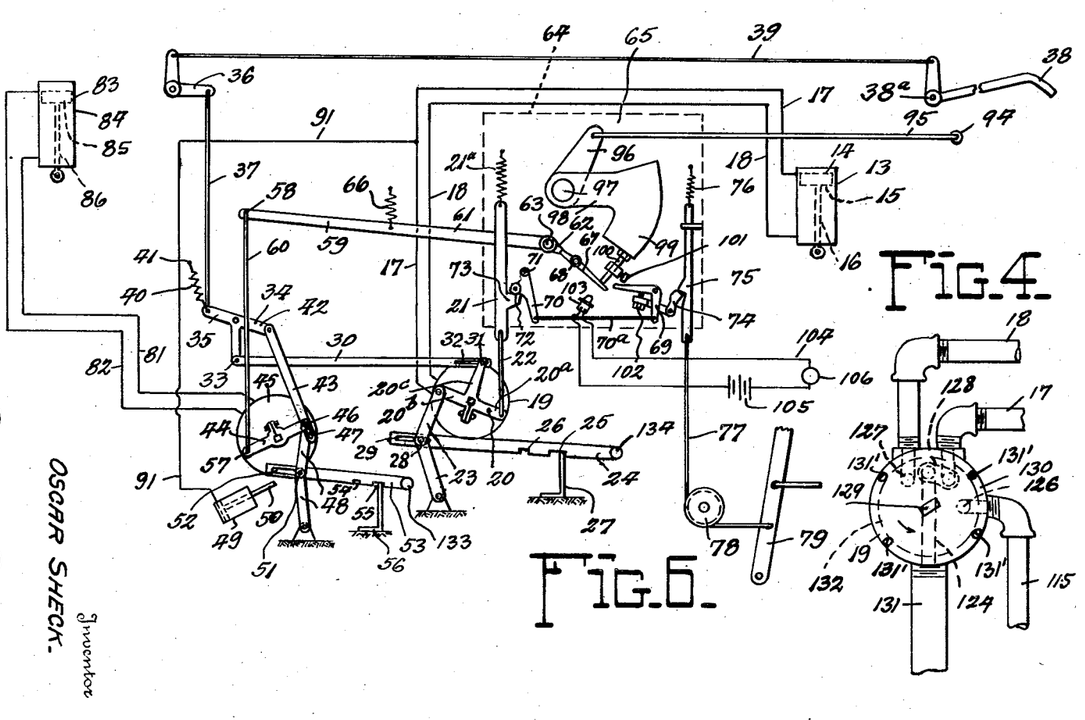
Figure 4 is a detail view of a control valve structure according to the present invention.
Figure 5 is a side view of the control valve of Figure 4, looking in the direction 5—5, certain parts being shown in section.

The cylinder 14 is connected by means of pipes 17 and 18 to a control valve 19, a detail of which is shown in Figures 4 and 5 and the construction of which will be described more specifically later on.

The control valve 19 comprises operating lever structure 20 of a T-like configuration. The arm 20a of the control lever 20 is connected to a latch bar 21 by means of a rod 22. The arm 20b of the control lever 20 is cooperatively interconnected by means of toggle links 23 to a latch bar 24, having notches 25 and 26 cooperating with a latch plate 27. The toggle links 23 are interconnected with the latch bar 24 by means of a pin 28 which operates within a slot 29 of the latch bar 24.

The arm 20c of the control lever 20 is interconnected with a link 30 by means of a pin 31 operating within a slot 32 on said link 30. This link 30 is connected at 33 to a three-arm lever generally indicated at 34. The portion 35 of the three-arm lever 34 is connected with a bell crank member 36 by means of rod 37. The other arm of this bell crank member 36 is operatively associated with a long trip lever 38 by means of rod 39. The portion 35 of the three-arm lever 34 is furthermore attached to one end of a coil spring 40, the other end of which is secured to the general frame structure of the machine, not shown, as at 41. The lever arm portion 42 of the member 34 is pivotally connected to a link 43 which connects with control lever 44 of a control valve 45 by means of a pin 46 operating within a slot 47 of the link 43. The control lever 44 is further operatively interconnected by means of pin 46 with toggle links 48 operatively associated with a control cylinder and piston arrangement 49 by means of a piston rod 50.

The toggle links 48 are pivoted relatively to each other by means of a pin 51 operating within a slot 52 of a latch bar 53 provided with notches 54 and 55 cooperating with a latch plate 56.

Pivotally connected at 57 to control lever 44 and at 58 to an arm 59 is a rod 60. The arm 59 comprises a long lever portion 61 and a short lever portion 62. This arm is pivoted as shown at 63 within the housing 64 of the batchmeter 65. Interposed between the portion 61 of the arm 59 and the frame of the paver is a coil spring 66 which is for purposes specifically referred to later on.

The lever arm portion 62 cooperates with a latch member 67 pivoted at 68 within the batchmeter housing in such a manner as to retain the latch member in locked position during a certain period in the operation of the device, as will be more readily understood from the description of its operation given hereinafter.

Included within the housing of the batchmeter and pivotally secured thereto is a bell crank trip lever 69 cooperatively interconnected with a roller lever 70 pivoted to the batchmeter housing at 71. The roller lever 70 carries the roller member 72 which is adapted to engage a lug 73 forming a portion of the latch bar 21. When the latch bar is moved downwardly from the position shown in Figure 6, the roller 72 will engage above the lug 73 and hold the latch bar 21 in its downward position until the bell crank lever 69 is tripped by certain parts of the batchmeter later referred to.

Operatively associated with the bell crank lever 69 and pivotally mounted adjacent thereto is another bell crank member 74 which is adapted to engage and retain latch bar 75, as clearly shown in Figure 6. This latch bar 75, which is slidably arranged within the batchmeter housing, is retained in the position shown in Figure 6 by means of a coil spring 76. To the lower end of the latch bar is secured a cable 77 which is trained over a sheave 78 or similar means and attached at its opposite end to the skip clutch lever 79. Operation of the skip clutch lever 79 causes operation of the skip clutch for causing elevation of the charging skip 80 of the machine by clutching the skip hoisting mechanism with the power engine for operation. These parts are not shown as they are of the usual conventional construction employed in such machinery for such purposes, and will be quite obvious to those skilled in the art.

The control valve 45 is connected by means of pipe lines 81 and 82 with the discharge chute operating means generally indicated at 83. These discharge operating means comprise a cylinder 84, piston 85 and piston rod 86. The piston rod 86 is connected to the lever arm 87, which in turn is secured to discharge chute 88 pivotally secured as at 89 at the discharge end of the mixing chamber 3 and within the circular discharge opening 90 of the same. The discharge chute 88 is movable from its discharging position, as shown in full lines in Figure 1, to its non-discharging position, as shown in dotted lines in the same figure. A pipe line 91 connects the cylinder and piston arrangement 49 with the pipe line 17. A more specific explanation of these parts will be found hereinafter.

Figure 2:
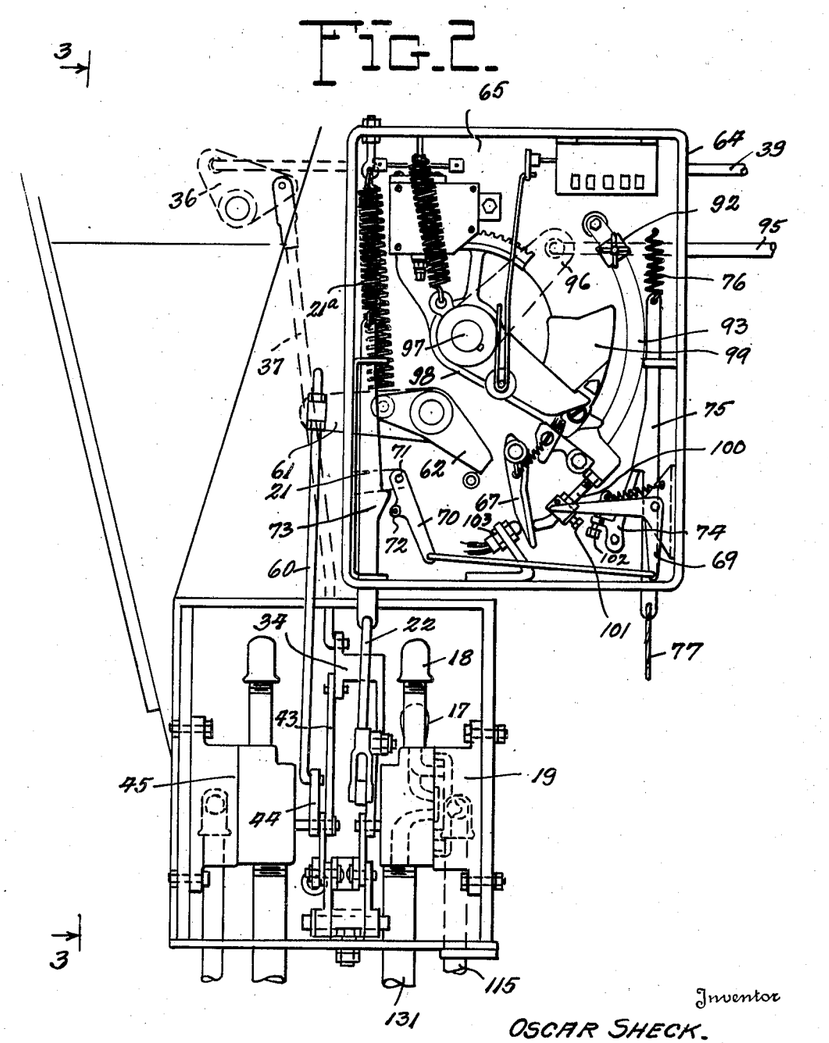
Figure 2 is a front elevation of the batchmeter construction and the control instrumentalities associated with the same for carrying out the controlling functions for the mixing operations of the paver.
Figure 3:
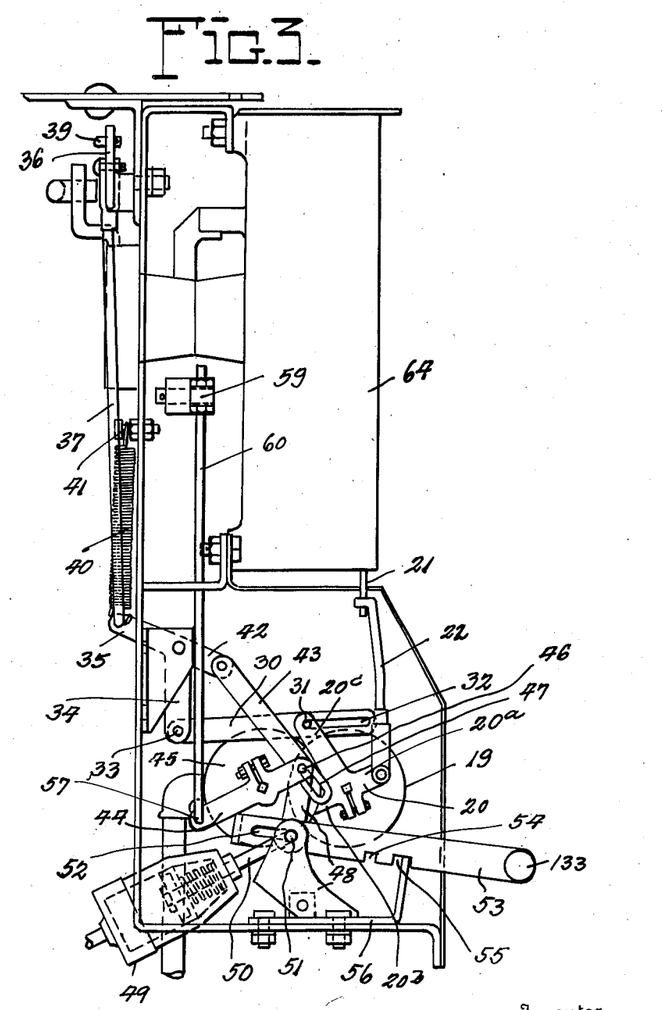
Figure 3 is a side elevation of the mechanism shown in Figure 2, the figure being taken in the direction of the arrows 3—3 of Figure 2.

The batchmeter structure partially indicated at 65 in Figure 6 is more specifically shown in Figure 2 and is of the same construction as disclosed in U. S. Patent No. 1,451,483 to H. O. Winkler. This batchmeter structure comprises primarily a block 92 adjustably arranged upon the quadrant 93 and movable to predetermined positions thereon, depending upon the length of mixing time desired for the batch of materials to be handled. When the batchmeter has been set by the adjusting means above referred to for the desired period of mixing time, the batchmeter is set for operation by raising the charging skip 80 which will, at a proper point in its elevation, engage a roller 94 mounted on a rod 95 and cooperatively associated with a lever arm 96 secured to a shaft 97, upon which is also mounted a lever 98 carrying the weight 99. The action of the skip will therefore raise the weight 99 upwardly from the position shown in Figure 2, to a certain extent, whereupon the weight 99 will slowly move downwardly under the control of the escapement mechanism of the batchmeter structure until the parts again reach the position shown in Figure 2. It will further be seen that the weight 99 carries a trip rod 100 adapted to engage the lever 67 in a manner which will become evident from the description of the operation of the device.

While the signalling instrumentalities of the Winkler batchmeter structure, above referred to, have been entirely eliminated in the arrangement of the control mechanism of the present invention, the parts 21, 70, 69, 74, 103 and 75 have been added and arranged in cooperative relationship with the bachmeter structure as disclosed in the Winkler patent, in such a manner as to obtain various control and locking means in cooperation with the control mechanism shown in Figure 6 for carrying out certain special functions, all of which will be more fully explained later on.

The trip rod 100 carries also an abutment 101, which, during its descent from an elevated position to the position as shown in Figure 2, is adapted to engage the bell crank trip lever 69, to thereby effect unlocking of the latch bars 21 and 75 previously referred to. The abutment 101 may be preferably adjustable, and the bell crank 74 may also be provided with an adjustment screw 102 to adjust this bell crank lever in regard to the bell crank trip lever 69.

The batchmeter structures shown in Figures 2 and 6 may be further provided with an electric push button switch 103 associated with an electric circuit 104 and a source of electric energy 105 to effect operation of a signal lamp 106 upon closing of the circuit 104 by the lever 67 upon its downward movement to effect closing of the switch 103.

The water control valve 10 referred to hereinbefore is connected to an operating arm 107 by means of a bell crank 108 and rods 109 and 110. Cooperatively associated with the arm 107 is a plurality of trip levers 111 and 112.

Mounted to the side of the charging skip structure 80 is a roller 113 which is adapted to engage during the upward movement of the charging skip when the same moves to discharging position, the trip lever 112, to thereby operate the water control valve 10 to cause introduction of the water from the measuring tank into the mixing chamber 2. Upon lowering of the charging skip and after the aggregates have been placed into the mixing chamber 2, the roller 113 will engage the trip lever 111 to effect closing of the water control valve.

Furthermore, during the upward movement of the charging skip 80, the roller 113 will also engage the long trip lever 38 to effect operation of the control valves 45 and 19 and associated instrumentalities, in a manner clearly brought out during the description of the operation of the entire control mechanism.

Pipe lines 114, 115, connect the control valve 19 and 45 with the air supply line 116, which may be connected to an air supply tank or reservoir in any convenient manner.

The valve 19 comprises a casing 117 having a circular recess 118 within which the valve disc 119 is adapted to operate. The valve casing 117 comprises a passage 120 leading to an opening 121 within the recess portion of the valve casing 117. This passage 120 is connected to the pipe 18. The valve casing 117 further comprises the passage 122 leading also to an opening within the recess portion of the valve body 117, as shown at 123. The passage 122 is connected to the pipe line 17. An exhaust passage 124 connects the opening 125 within the recess portion of the valve casing 117 with the atmosphere. The valve disc 119, as best seen in Figure 9, is provided with a plurality of openings 126 and 127. These openings extend through the entire disc structure from one side to the other. The disc 119 is further provided with an elongated recess 128 positioned between the openings 126 and 127. A shaft 129 extending through the valve casing 117 and attached to the disc 119 permits operation of said disc member so as to interconnect the valve passages in a manner later referred to.

The valve casing is closed by means of a covering 130 secured to the casing by means of screws 131' or the like. This cover member comprises a passage 132 which is connected over the air inlet pipe 115 to pipe line 116 and the air supply reservoir of the machine.

With the parts in position as shown in Figure 4, compressed air is admitted over the line 115, passage 132, to line 18 leading to the lower portion of the cylinder 14 so as to effect upward movement of the piston 15 while the air above the piston 15 is discharged from the cylinder 14 over pipe line 17, elongated recess 128, and passage 124 leading to the atmosphere. It will therefore be seen that an upward movement of piston 15 is thereby effected, moving the transfer chute 6 to mixing or non-transferring position. When the valve disc 119 is rotated in the direction of the arrow in Figure 4, the elongated recess 128 will be shifted to the left so as to interconnect the pipe line 18 with the exhaust passage 124 while at the same time the opening 126 in the valve disc will interconnect the passage 132 of the cover of the valve casing with the opening 123 and passage 122 in the valve casing, and finally with pipe line 17. It will therefore be seen that the air pressure is now applied in the opposite direction to the cylinder 14 so as to cause downward movement of the piston 15 to effect movement of the transfer chute to transferring position.

In like manner the valve 45 will control the movement of the discharge chute 88 to mixing (non-charging) or discharging positions. In other words, when the air pressure is applied to the cylinder 84 over pipe line 81, the piston 85 will move upwardly and thereby place the discharge chute 88 in mixing position. At such time the pipe line 82 is connected to the atmosphere or exhaust passage. If the air pressure is reversed and pipe line 82 connected with the air reservoir by means of the valve 45, piston 85 will move downwardly and effect movement of the discharge chute to discharging position. At this time the pipe line 81 will be connected to the atmosphere, as will be readily understood from the specific description in regard to valve 19 hereinbefore given.

Figures 5, 7:
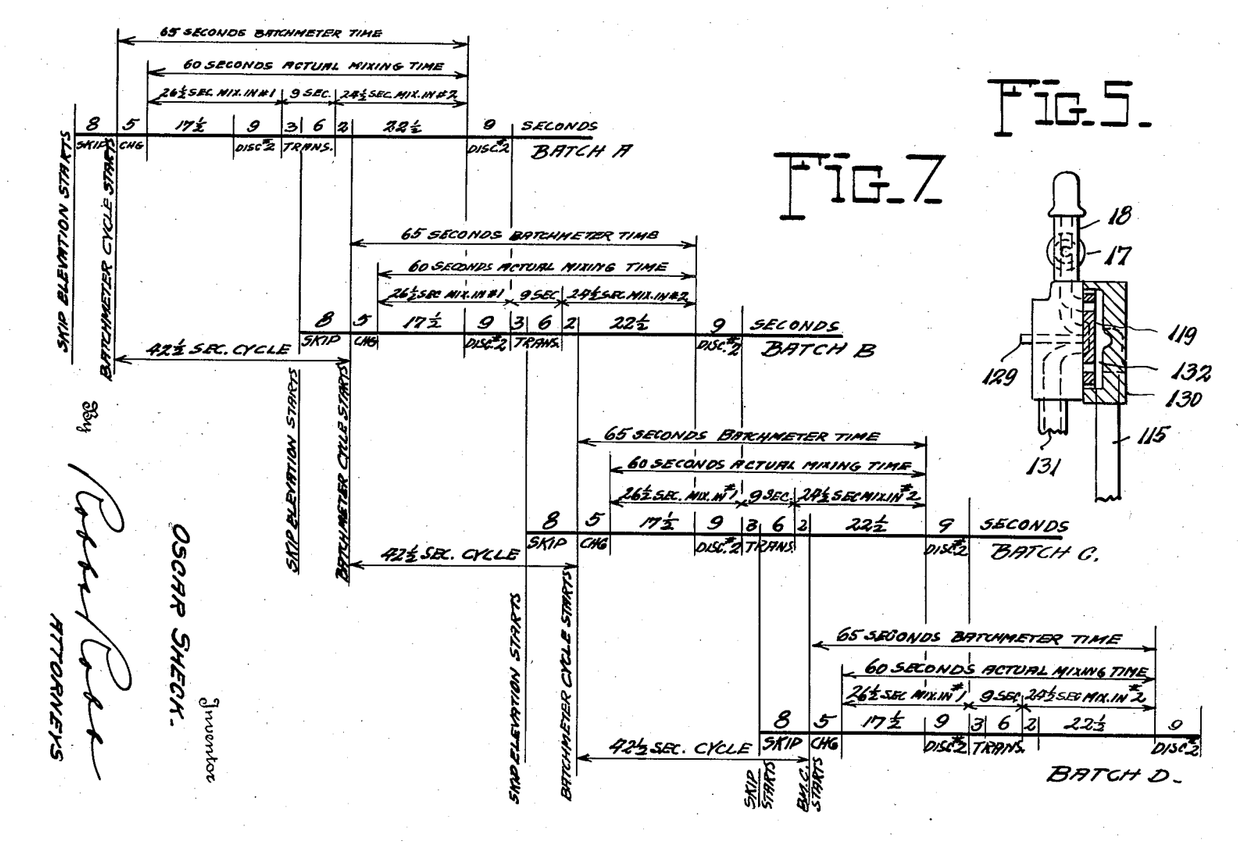
Figure 7 illustrates a cycle diagram of the mixing operations for the machine of the present invention.

Figure 7 is a diagrammatic illustration of the mixing cycle of a twin batch paving machine as controlled by the mechanism set forth in the present invention. This cycle clearly indicates the respective mixing periods in the mixing chambers 2 and 3 and further demonstrates clearly the operation of the various instrumentalities which effect charging, transfer, and discharging of the aggregates. The overlapped operation of the mixing cycles in mixing chambers 2 and 3 is very clearly brought out by this diagram, which will be readily understood without any further reference thereto.

The operation of the control mechanism of the present invention is as follows: The operator, by the usual control lever 79, causes skip 80 to rise for charging of the mixing chamber 2 of the drum 1. As the skip rises, the roller 113, which is mounted on the side portion of the charging skip, strikes the trip lever 112 and rocks the arm 107 which is cooperatively associated with said trip lever and connected by a rod 110 to the bell crank lever 108. This bell crank lever 108, which is in turn connected to the water control valve 10, causes operation of the latter so as to admit water through pipe 11a and pipe 11 of the bracket 8, into the mixing chamber 2. As the skip continues in its upward movement for discharging of the solid aggregate materials into the mixing chamber 2 and shortly before the charging skip approaches its upward limit of movement, the roller 113 strikes the long trip lever 38 which is pivoted at 38a. The resulting movement of the long trip lever 38 operates bell crank member 36 and the three-arm lever 34. One arm of this three-arm lever 34 is connected by link 43 with the control lever 44 of the control valve 45. The control lever 44 is also connected to the arm 61, as shown in Figure 2, and somewhat exaggeratedly shown in the diagram of Figure 6. The arm 61 is operated by certain parts of the batchmeter, as will be later described. The actuation of the link 43 in the manner just described raises its lower slotted end so as to hold the lower extremity of the slot 47 against the pin 46 on the end of the lever 44. At the same time the operation of the three-arm lever 34 causes link 30, which is also connected thereto, to shift the crank arm 20c of the valve lever 20, to the right. The action of rocking the lever 20 tends to straighten the toggle links 23 which are connected by pin 28 to the slotted left-hand end of latch bar 24 which coacts with the latch plate 27 and is provided with lock notches 25 and 26.

The operation of the valve lever 20 causes corresponding movement of the valve disc 119 of the control valve 19 so as to position the latter to admit air from the intake pipe 115 to pipe line 18. The compressed air admitted to the transfer cylinder 14 over pipe 18 causes the piston 15 in said cylinder to move upwardly to thereby shift the transfer chute 6 from a transferring position to its mixing position. At this time the pipe line 17 is connected to the exhaust, as already specifically referred to in connection with the description of Figure 4.

The movement of the control lever 20 above referred to causes also a downward movement of the latch bar 21 within the batchmeter casing 64 in view of the fact that said latch bar is connected to the control lever 20 by means of the rod 22. This downward movement of the latch bar 21 rocks the roller lever 70 to the right, permitting lug 73 of the latch bar 21 to engage beneath the roller 72 of the roller lever 70 and thus detain the latch bar 21 in its lower position. Later in the operation of the control instrumentalities the roller lever 70 is actuated to release the lug 73 of the latch bar 21 upon operation of the bell crank trip lever 69 with which it is connected by means of a rod 70a. The bell crank trip lever 69 is tripped in the operation of the batchmeter by the descending weight 99, the operation of which is known according to the showing of the Winkler patent above referred to.

In accordance with the above description, the discharge cylinder control valve 45 and lever 44 are in the position shown in Figure 6 and are retained in such position by the action of the piston rod 50 of the piston and cylinder arrangement 49. The air lines for the transfer cylinder or ram 14 and the air lines for the discharge cylinder and piston arrangement or ram 84 which is associated with the discharge chute are diagrammatically shown in Figure 6.

With the parts in the position referred to above, the discharge skip 80 is still ascending and the roller 113 is still in engagement with the long trip lever 38. During the final upward movement in the operation of the skip, the same will now engage, with its portion 80a, the roller 94 mounted on rod 95 and thereby set the batchmeter 64 into operation by rocking the arm 96 counter-clockwise and thereby raising the weight 99. During the elevation of this weight 99 of the batchmeter, the lever or latch member 67 engages the inner end of the lever arm 61 as designated at 62, so as to lock the lever arm in said adjusted position as shown in Figure 6, in which position it has been placed by the action of the piston and cylinder arrangement 49 and held by bar 43 when the air was exhausted from cylinder 49 during the upward movement of piston 15.

The aggregates have now been discharged from the charging skip into the mixing chamber 2, and a predetermined quantity of water has also been admitted into said mixing chamber. The batchmeter is set for operation, as has been previously described, and the skip is now lowered to the ground, resulting in disengagement of the roller 113 from the long trip lever 38 so that spring 40 will return the member 38 to its original position.

During the downward movement of the charging skip, the roller 113 engages the trip lever 111, also associated with arm 107, to thereby rock the latter to close the water valve 10 and to open the valve to the measuring tank, not shown, for admitting a new supply of water to the latter.

During the operation of the batchmeter which has been set and conditioned for operation as hereinbefore stated, the weight 99 travels downwardly during a certain predetermined period for which the batchmeter has been adjusted. Before this weight reaches its lowermost position, the trip rod 100 attached to the same will engage the lever or latch member 67 to thereby force the long arm portion of the same downwardly and cause disengagement of the member 67 from the portion 62 of the arm 61. The arm 61 is thereupon pulled immediately in an upward direction by means of the spring 66. The above causes operation of the control lever 44 of the discharge cylinder control valve 45 in a clockwise direction for operating the discharge cylinder control valve in such a manner as to admit air to the upper end of the cylinder 84 through pipe 82, causing in turn movement of piston 85 in a downward direction and positioning of the discharge chute 88 to discharging position as shown in Figure 1.

Of course at this time with materials in the mixing chamber 2 at the beginning of the operation of the machine, there will be no aggregate materials in the mixing chamber 3, and when the discharge chute assumes discharging position as referred to above, there will actually be no discharge of materials at this time. However, when this discharge operation is effected during the regular mixing cycle of the machine, at which time there will be aggregate materials in the mixing chamber 3, transferred thereinto from the mixing chamber 2 by means of the transfer chute 6, materials will be discharged from mixing chamber 3 when the chute is moved to discharge position as above referred to.

The batchmeter weight continues to travel downwardly for a period of time necessary to discharge all material from the mixing chamber 3 until the abutment 101 engages the bell crank trip lever 69, thereby releasing latch bar 21 which will now move upwardly under the force of spring 21a and the control lever 20 will thereby be shifted upwardly of the position as shown in Figure 6. The transfer cylinder control valve 19 is thereby operated to admit air through pipe line 17 to the upper end of cylinder 14 to thereby cause downward movement of the piston 15 and to effect movement of the transfer chute 6 to transferring position. This will cause the material of the mixing chamber 2, which has been mixed therein for a certain length of time, to be transferred into the mixing chamber 3 from which material has just been discharged during the normal operation of the machine.

At the same time that air is admitted to pipe line 17, air is also admitted into the cylinder 49 through the pipe line 91. The piston rod 50 now pushes on the toggle joint of the links 48 so as to cause upward movement of the lever 44 to its original position and to admit compressed air through the pipe line 81 leading to the lower end of the discharge cylinder 84. Piston 85 will move upwardly and the discharge chute 88 will return to its mixing position, thus preventing the discharge of the incoming material of the mixing chamber 3.

The batchmeter weight 99 continues to travel several seconds until it reaches its lowermost position, at which time lever 67 contacts switch 103 closing the same thereby to effect operation of the signal light 106 which now indicates that the charging skip 80, which has in the meantime been loaded with a new batch of aggregates, can be raised and the mixing cycle may be repeated. The next cycle will take place in exactly the same manner as referred to in the operation of this device, with the only difference that at this time when the discharge chute 88 is moved to discharging position the finally mixed aggregates of the mixing chamber 3 will now actually be discharged therefrom. The duration of the mixing period of the aggregates is not interrupted when the same are transferred from chamber 2 to chamber 3, as this transferring operation is also in effect a mixing operation.

From the foregoing it will be seen that after the pre-mixed aggregates have been discharged from the mixer chamber 2 to the mixing chamber 3 of the drum 1, a new batch of aggregates may be entered into the mixing chamber 2 and in this way the mixing operations in the two chambers are overlapped and a considerable increase in the output of the machine, in comparison with a single drum mixer, is attained.

The above described operation is entirely automatic, with the exception of the raising and lowering of the skip, which is under the manual control of the operator. However, if the operator wishes to hold up the discharge or the transfer operation, the latch bars 53 and 24, respectively, may be operated manually by gripping their handle members 133 and 134, respectively. The manual operation of these latch bars just referred to consists in pulling the same outwardly until notch 54 or notch 26 is brought into engagement with the respective latch plates 56 or 27. This manual operation of the latch bars straightens the toggle joints 48 or 23, respectively, and prevents any actuation of the control levers 44 or 20 when the batchmeter releases them. In this way the latch bar 53 may be operated separately from the transfer latch bar 24 as often as desired. The transfer latch bar 24 can only be released by hand after the discharge is completed. When the transfer latch bar is manually operated in the manner above stated, the air cylinder 49 will act on the discharge cylinder control valve 45 and place the discharge chute 88 into mixing position as shown in Figure 1 in dotted lines.

The discharge and transfer actuating means 14 and 83, as well as the cylinder and piston arrangement 49 may be operated by compressed air as set forth hereinbefore; however, these instrumentalities may be operated by any other fluid medium, if desired, as will be obvious to those skilled in the art.

A compressor, not shown, arranged on the frame structure of the machine, may be preferably used for supplying compressed air to the reservoir or supply tank connected to the pipe line 116.

Having thus described my invention, what I claim as new and desire to secure by Letters Patent of the United States, is—

1. In a mixing machine for concrete or the like, in combination, at least two separate mixing chambers, charging means to introduce aggregates into one of said chambers, transfer means to carry said aggregates from said one chamber to a second chamber, discharge means for the second chamber, and a single batchmeter unit operable from the charging means and directly controlling the operations of the transfer means and discharge means whereby to effect transfer action of the transfer means when the discharge means is inoperative, and vice versa.

2. In combination, a mixer comprising a plurality of mixing chambers, charging means for said mixer, a transfer chute intermediate said mixing chambers and movable to transferring and non-transferring positions, a discharge chute on said mixer movable to discharging and non-discharging positions, a batchmeter, fluid operated means for actuating said transfer chute and discharge chute, control means for said fluid operated means operatively interconnected with said batchmeter, transfer chute, and discharge chute, instrumentalities for cooperatively interrelating said control means with the charging means for conditioning the transfer control means for subsequent actuation thereof by said batchmeter upon operation of the charging means, and manual means for locking said control means and thereby the transfer chute and discharge chute to prevent operation of the same under the influence of said control means.

3. In combination, a mixer comprising a plurality of mixing chambers, charging means for said mixer, a transfer chute intermediate said mixing chambers and movable to transferring and non-transferring positions, a discharge chute on said mixer movable to discharging and non-discharging positions, a batchmeter, fluid operated means for actuating said transfer chute and discharge chute, control means for said fluid operated means operatively interconnected with said batchmeter, transfer chute, and discharge chute, instrumentalities for cooperatively interrelating said control means with the charging means for initiating operation of certain of the control means incident to the operation of the charging means to effect an action of the transfer chute, manual means for locking said control means and thereby the transfer chute and discharge chute to prevent operation of the same under the influence of said control means, and devices for indicating the release of the interlocking means.

4. In combination, a mixer comprising a plurality of mixing chambers, charging means for said mixer, a transfer chute intermediate said mixing chambers and movable to transferring and non-transferring positions, a discharge chute on said mixer movable to discharging and non-discharging positions, a batchmeter, fluid operated means for actuating said transfer chute and discharge chute, a plurality of control valves for said fluid operated means, control instrumentalities for cooperatively interconnecting said control valves with respect to each other and said batchmeter, and devices cooperating with said charging means for initiating operation of certain of said control instrumentalities upon operation of said charging means to effect an action of the transfer chute.

5. In combination, a mixer comprising a plurality of mixing chambers, charging means for said mixer, a transfer chute intermediate said mixing chambers and movable to transferring and non-transferring positions, a discharge chute on said mixer movable to discharging and non-discharging positions, a batchmeter, fluid operated means for actuating said transfer chute and discharge chute, a plurality of control valves for said fluid operated means, control instrumentalities for cooperatively interconnecting said control valves with respect to each other and said batchmeter, devices cooperating with said charging means for initiating operation of certain of said control instrumentalities upon operation of said charging means to effect an action of the transfer chute, and manual means associated with said control valves for locking the same against operation.

6. In combination, a mixer comprising a plurality of mixing chambers, charging means for said mixer, a transfer chute intermediate said mixing chambers and movable to transferring and non-transferring positions, a discharge chute on said mixer movable to discharging and non-discharging positions, a batchmeter, fluid operated means for actuating said transfer chute and discharge chute, a plurality of control valves for said fluid operated means, control instrumentalities for cooperatively interconnecting said control valves with respect to each other and said batchmeter, devices cooperating with said charging means for initiating operation of certain of said control instrumentalities upon operation of said charging means to effect an action of the transfer chute, and automatic means for locking the control valves against operation incident to the operation of said batchmeter.

7. In combination, a mixer comprising a plurality of mixing chambers, charging means for said mixer, a transfer chute intermediate said mixing chambers and movable to transferring and non-transferring positions, a discharge chute on said mixer movable to discharging and non-discharging positions, a batchmeter, fluid operated means for actuating said transfer chute and discharge chute, a plurality of control valves for said fluid operated means, control instrumentalities for cooperatively interconnecting said control valves with respect to each other and said batchmeter, devices cooperating with said charging means for initiating operation of certain of said control instrumentalities upon operation of said charging means to effect an action of the transfer chute, automatic means for locking the control valves against operation incident to the operation of said batchmeter, and manual means associated with said control valves for locking the same against operation.

8. In a mixing machine of the class described, a mixer, comprising a plurality of mixing chambers, one arranged to receive aggregates from the other, a transfer means for transferring aggregates from one of the mixing chambers to the other, a discharge means for discharging the aggregates transferred to said other mixing chamber, a batchmeter unit controlling the operations of the transfer means and said discharge means, said batchmeter unit comprising mechanisms operating in sequence to first effect the movement of said discharge means to discharge position, and then subsequently cause movement of the transfer means to transfer position.

9. In combination, a mixer having a plurality of mixing chambers, discharge means for said mixer movable to non-discharging and discharging positions, transfer means intermediate said mixing chambers and movable to transferring and mixing positions, automatic means controlling the mixing period within said mixing chambers comprising a single batchmeter unit including a timing device, first control instrumentalities for said discharge means and second control instrumentalities for said transfer means, mechanism operable by said timing device in proper sequence to first cause actuation of said first control instrumentalities to control the action of said discharge means and subsequently to cause actuation of said second control instrumentalities to control the action of said transfer means.

10. In combination, a mixer having a plurality of mixing chambers, discharge means for said mixer movable to non-discharging and discharging positions, transfer means intermediate said mixing chambers and movable to transferring and mixing positions, automatic means controlling the mixing period within said mixing chambers comprising a single batchmeter unit including a timing device, first control instrumentalities for said discharge means and second control instrumentalities for said transfer means, and mechanism operable by said timing device in proper sequence to first cause actuation of said first control instrumentalities to control the action of said discharge means and subsequently to cause actuation of said second control instrumentalities to control the action of said transfer means, and means operable upon operation of said second control instrumentalities to cause movement of said discharge means from discharging to non-discharging position.

11. In a concrete mixer, mixing means comprising a plurality of mixing chambers including a first chamber to receive aggregates to be mixed and a second chamber to which the aggregates mixed in the first chamber are transferred, a discharge chute for the second chamber, a transfer chute operable to transfer aggregates from the first chamber to the second chamber, operating instrumentalities for said chutes including fluid pressure means, control valves for said fluid pressure means including a first valve to control the operation of the transfer chute for effecting movement thereof to transfer and non-transfer positions, and a second valve for controlling the operation of the discharge chute to discharge and non-discharging positions, batchmeter mechanism for controlling the operation of said valves, and instrumentalities intermediate said first and second valves to control operation of the second valve for effecting movement of the discharge chute to non-discharging position coincident with the operation of the first valve to control movement of the transfer chute to transfer position.

OSCAR SHECK.